June 29, 1954 H. NAGIN 2,682,292
CONTINUOUS SYSTEM FOR FORMING FIBER AND PLASTIC SHAPES
Filed Aug. 29, 1950 2 Sheets-Sheet 1
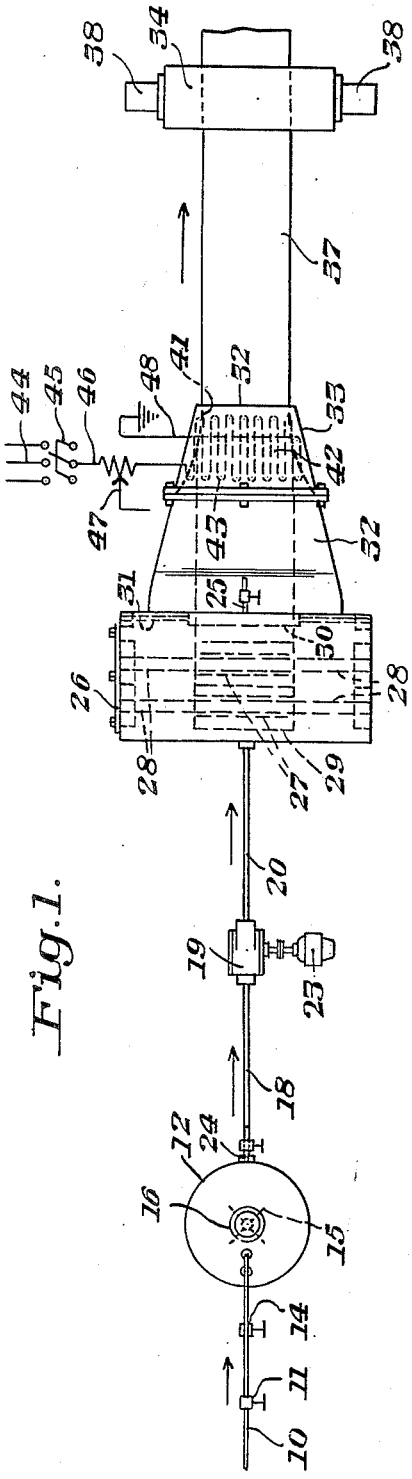
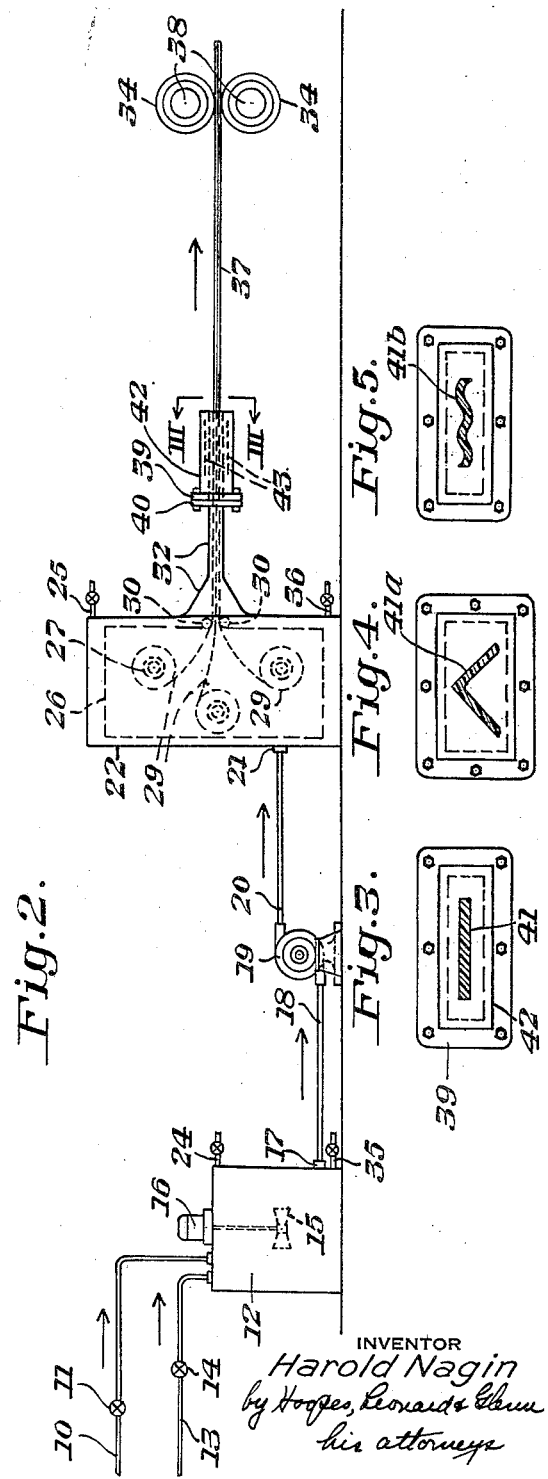
INVENTOR
*Harold Nagin*
by Hoopes, Leonard & Glenn
his attorneys

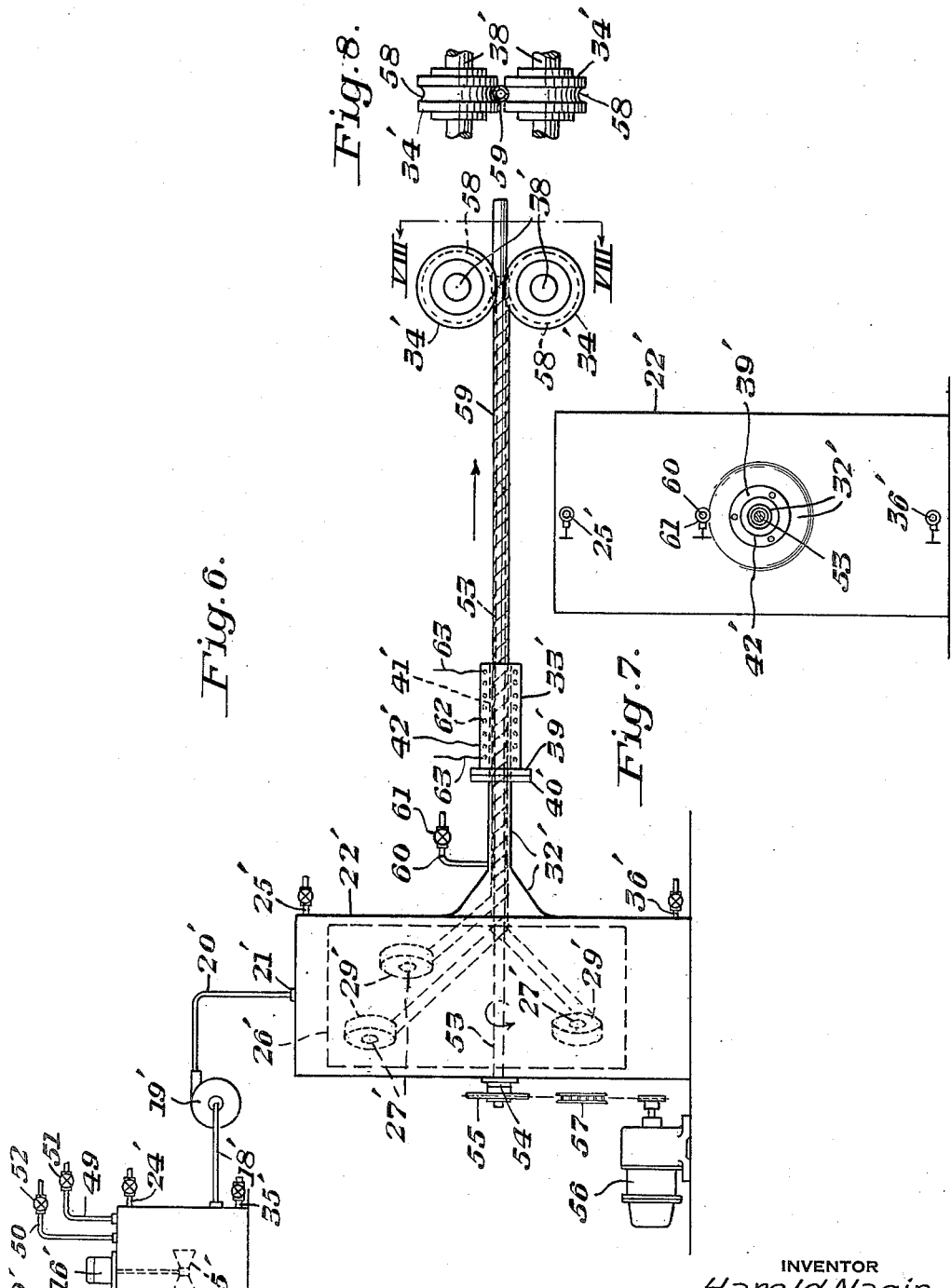

Patented June 29, 1954

2,682,292

UNITED STATES PATENT OFFICE 2,682,292

CONTINUOUS SYSTEM FOR FORMING FIBER AND PLASTIC SHAPES

Harold Nagin, Pittsburgh, Pa., assignor to Reliance Steel Products Company, McKeesport, Pa., a corporation of Pennsylvania Application August 29, 1950, Serial No. 181,955

3 Claims. (Cl. 154—1)

This invention relates to a system for continuously casting various elongated shapes of hardenable plastic in which fibrous material is embedded or fixed. More particularly, this invention relates to a continuous system in which such fibrous material in laminated relation and surrounding plastic pass through a die in the course of which passage the plastic is hardened.

In the art of producing elongated fiber filled plastic shapes whether in sheet, strip, corrugated, angle or irregular form, many present day methods of production are time consuming and costly. This is especially so in the case of those forms involving a greater amount of shaping. In many such operations, it is particularly desirable to use fibrous material in the form of layers of cloth, for example, such layers being in laminated relation to give body and strength to the final plastic article.

In the present invention, a variety of fiber and plastic shapes, including tubular, can be continuously made quickly and at relatively low cost. Other objects and advantages of this invention will be apparent from the following description and from the drawings, which are schematic only, in which Figure 1 is a top view of one embodiment of the system of this invention for making a continuous strip of thermosetting plastic in which laminated fiber cloth is embedded;

Figure 2 is a view in side elevation of the embodiment shown in Figure 1;

Figure 3 is a view from the delivery end of the die used in the embodiment shown in Figures 1 and 2;

Figures 4 and 5 are end views of dies for making angle and corrugated fiber and plastic shapes respectively;

Figure 6 is an embodiment of the system of this invention which may be used in making a tubular fiber and plastic shape using a thermosetting plastic;

Figure 7 is an end view of the feeder and die elements of the embodiment shown in Figure 6; and Figure 8 is a view taken along line VIII—VIII of the drawing rolls illustrated in Figure 6.

In the embodiment shown in Figures 1 to 3, any thermosetting plastic which can exist as a liquid prior to hardening may be pumped through a pipe 10 and regulating valve 11 into a mixer vessel 12. If desired, a compatible accelerator for accelerating the hardening or curing of the plastic may be pumped through a pipe 13 and regulator valve 14 into the vessel 12. In some cases no accelerator will be required. Whenever one or more materials in addition to the plastic is fed into vessel 12, an agitator 15 rotated by motor 16 mounted on the top of vessel 12 may be used to insure uniform intermixing of the contents of vessel 12.

These contents pass out of vessel 12 through an outlet 17 connected to a pipe 18 leading to the suction end of a pump 19. Pump 19 delivers such contents through a pipe 20 connected to the delivery end of the pump and an inlet 21 of a feeder vessel 22. Pump 19 may be operated assuming, for example, that it is a centrifugal pump, by an electric motor 23.

Feeder vessel 22 is wholly enclosed as is the vessel 12 to enable the operation to proceed in the absence of air whenever desirable. In initiating a cycle of operations in accordance with the system of this invention, vents 24 and 25 connected to the uppermost parts of the respective vessels 12 and 22 can be used until such vessels are filled. Upon the filling of such vessels the vents 24 and 25 are closed and thereafter the operation proceeds in the absence of any air in the equipment. An access door 26 is bolted to one side of feeder 22 and sealed thereagainst by a gasket. Such access door enables reels 27 on arbors 28 to be mounted within feeder 22. On each of these reels 27 may be placed rolls 29 of fibrous material in the form, for example, of fiber glass cloth. Any such fibrous material whether natural or synthetic, nonmetallic or metallic, and whether in cloth form or in the form of parallel strands may be employed. Such fibrous material should be inert relative to the plastic and any other materials that are used.

A pair of superposed guide rolls 30 are mounted on arbors 31 within feeder 22 immediately in advance of outlet 32 so that the fibrous material 29 as unrolled from the reels 27 passes between the guide rolls 30 in laminated relation along a path proceeding through outlet 32, a die 33 and drawing rolls 34. Drains 35 and 36 are respectively provided on vessels 12 and 22 to enable all remaining contents to be removed whenever the vessels are to be cleaned, for example, at the conclusion of an operating cycle.

The advance portion of outlet 32 above and below the aforesaid path is sufficiently extensive to afford a plentiful supply of plastic entirely surrounding the fibrous material and sealing the interstices immediately in advance of the entrance of the fibrous material into the die 33. Outlet 32 also diverges in a horizontal plane toward feeder 22 to assist in assuring as complete saturation of the fibrous material with the plastic in as liquid condition as possible. In addition, the delivery pressure of pump 19 will normally keep feeder 22 entirely filled so that there is a "head" of plastic material above outlet 32. The pressure on the plastic in liquid condition in feeder 22 will be sufficient to cause it to be forced out through outlet 32 and die 33 with the fibrous material 29. As for the fibrous material, the drawing rolls 34 in superposed relation bear against the finished plastic strip 37 of hardened plastic in which fibrous material 29 is embedded in laminated relation. As the drawing rolls 34 are turned on their shafts 38 by means not illustrated, they will unreel the fibrous material 29 on the reels 27, pulling it through the rolls 30, the outlet 32 and the die 33. In some cases, the drawing of the fibrous material by the drawing rolls 34 may be sufficient to supply the necessary force to withdraw plastic from feeder 22 through the outlet 32 and die 33.

The die 33 is a removable member having a flange 39 bolted to a companion flange 40 at the delivery end of outlet 32. Die 33 is provided with a shaping orifice 41 having a continuous unbroken wall surface in direct alignment with and forming a continuation of the delivery end of outlet 32. Between the wall defining orifice 41 in die 33 and the outer shell 42 of die 33 a space is provided for the insertion of electrical heating elements 43 immediately above and below the orifice, and along the sides thereof whenever required. These electrical heating elements 43 receive their energizing current from a conductor 44 through switch 45 and conductor 46. A variable resistance 47 is placed in the circuit of conductor 46 to vary the amount of heating and hardening temperature that may be required to suit the particular thermosetting plastic selected. The other end of the heating elements 43 are series connected to a conductor 48 leading to a ground or differential voltage connection.

It will be noted from Figure 1 that the sides of orifice 41 converge when proceeding from the entrance to the delivery end of die 33. Similarly, a vertical convergence from entrance to delivery end may be provided for those plastics in which there is material shrinkage during hardening or curing. Such a die 33 and its orifice 41 will be dimensioned in any particular embodiment for the specific plastic to be employed including its change of volume characteristics. Similarly, the length of die 33 and orifice 41 and the rate of travel of the strip 37 will be regulated and controlled to permit the plastic in liquid condition passing from feeder 22 to harden in the shape given to it by orifice 41 in the course of its passage through orifice 41. The strip 37 therefore issuing from the delivery end of die 33 is a hardened plastic in which the laminated fibrous material 29 is completely embedded and fixed. Similar regulation and control may be effected as will be understood by those skilled in the art in the case of the use of dies having different shaping orifices such as orifices 41a and 41b respectively.

In the modification illustrated in Figures 6 to 8, a circular hollow laminated tube of fiber and plastic may be continuously produced. Those parts of that modification which are similar in general construction and function to corresponding parts shown in the embodiment illustrated in Figures 1 to 3 are given the same reference numerals with the addition of a prime thereto. It will be noted that additional pipes 49 and 50 with respective regulator valves 51 and 52 are shown leading into mixer vessel 12'. Such additional pipes may be used, for example, to supply coloring material and an inhibitor. The inhibitor might be used in those cases in which the plastic is particularly susceptible to oxidation or to premature hardening if the inhibitor is not included. Supply pipes for coloring material and inhibitor may also be included if desired in the embodiment shown in Figures 1 to 3.

Within feeder 22' a mandrel 53 is mounted. Mandrel 53 is journaled in a bearing 54 connected to the front wall of feeder 22' and extends therethrough and through a suitable bushing. A sprocket wheel 55 is connected to the outer end of mandrel 53 so that it may be turned by a combination electric motor and gear transmission 56 through a sprocket chain 57. The other end of mandrel 53 is positioned by and rotates within a circular recess formed by the circumferential semicircular grooves 58 at the nip of the respective drawing rolls 34'.

Within feeder 22' the rolls 29' of fibrous material are relatively narrower and are offset in oblique manner relative to the axis of mandrel 53 and a plane perpendicular to that axis. Such a mounting as shown in Figure 6 enables the turning mandrel 53 to unreel the rolls 29' winding the fibrous material, preferably in the form of cloth, in helical fashion around the mandrel immediately in advance of the front of outlet 32' which in this embodiment is generally circular.

Mandrel 53 may be tapered as required from the end nearer sprocket 55 to the end at drawing rolls 34' to take care of any shrinkage and to promote the freeing of the hardened tubular shape 59 from the mandrel 53. The continued rotation of mandrel 53 unwinds the fibrous material 29' from the reels 27' and advances it along the length of the mandrel 53 lubricated in part by the presence of the surrounding plastic in liquid condition existing in feeder 22' and outlet 32'. A pipe 60 and regulator valve 61 may be employed in the narrower portion of outlet 32' to supply a limited amount of a suitable lubricant to be carried around with the fiber and unhardened plastic as it enters circular orifice 41' of die 33'. Orifice 41' as shown is cylindrical but may be tapered or conical to allow for the particular change of volume characteristic of the specific plastic used. An electric heating induction coil 62 is provided in die 33' between the wall of orifice 41' and the shell 42'. The leads 63 connect coil 62 to a suitable source of high frequency current.

As in the earlier embodiment, the plastic surrounding fibrous material 29' is hardened or cured in the course of its regulated and controlled rate of passage through orifice 41'. As the tubular shape 59 passes beyond drawing rolls 34', it is free of the mandrel 53 and may be cut in such lengths as desired.

By way of example and not limitation, a polyethylene glycol type of plastic material may be obtainable as a viscous liquid. One commercial form of this plastic will harden in about fifteen minutes at a temperature of about 250° F. when about 1.5% by volume of benzoyl peroxide catalyst is present. Thus, in using such a plastic in the system of this invention, the passage thereof through a die such as die 33 or 33' would be regulated to take the necessary hardening period of fifteen minutes and the temperature of the die communicable to the plastic would be 250° F. As is well understood by those in the plastic art, other suitable materials may be used as such catalysts or accelerators and in some cases compromises of hardening time and hardening temperature in inverse ratios may be obtainable. Such plastics further will be selected in practicing this invention which are relatively compatible with the material of which the equipment is made in which the system is operated.

The foregoing embodiments of the system of this invention have been described in connection with a thermosetting plastic material. However, thermoplastic plastic materials may also be employed in which case suitable heating elements may be mounted in or in connection with the mixing and feeder vessels and suitable insulation employed along the pipes connecting those vessels and leading to the dies 33 or 33' as the case may be. Between the walls of the orifices and the shells of those dies a cooling fluid may be circulated to harden the thermoplastic plastic materials used. Such circulation of the cooling fluid would require the removal of the heating elements in the respective dies and their leads and the insertion of inlet and outlet pipes respectively to the space between the orifice wall and the shell of the die. In this description, the word "curing" is used in a sense synonymous with the hardening of the plastic material whether it be thermosetting or thermoplastic in its characteristic.

The precise dimensioning of the respective parts of the system of this invention, the selection of particular fibrous, plastic and addition materials and the conditions and rates of operation can readily be supplied by those well skilled in the plastics art when following the teachings of the system of this invention.

I claim:

1. In a continuous system for forming a hard laminated fiber and plastic shape, the steps comprising, providing a pool of plastic comprising a thermally hardenable liquid, mounting at least one group of continuous fibers in compact unextended form to be pulled out within said pool, pulling said fibers out within and in laminated relation to said plastic, passing said plastic and fibers through a shaping zone forming a submerged outlet for said pool, and varying the temperature of said plastic in the course of said passing to convert said plastic and fibers into an integral hard laminated shape.

2. In a continuous system for forming a hard laminated fabric and plastic shape, the steps comprising, maintaining a wholly enclosed liquid pool of plastic comprising a thermally hardenable liquid, mounting at least one layer of fabric in compact unextended form within said pool to be drawn out within said liquid, feeding plastic into said pool to provide a fluid pressure therein, drawing said fabric out within and in laminated relation to said plastic, passing said plastic and fabric through a shaping zone forming a submerged outlet for said pool, varying the temperature of said plastic in the course of said passing to convert said plastic and fabric into an integral hard laminated shape, and pulling said hard shape after said passing through said shaping zone to draw said fabric through the same in said laminated relation to said plastic.

3. In a continuous system for forming a hard laminated fabric and plastic shape, apparatus comprising a wholly enclosed feeder containing a pool of plastic comprising a thermally hardenable liquid, means for forcing plastic into said feeder to maintain a fluid pressure therein, said feeder having an outlet below its top and the top of said pool, a circular die connected to said outlet in registry therewith, a rotatable mandrel extending at least partly through said feeder and passing out through said outlet and die, at least one reel containing a continuous length of fabric, said reel being mounted in oblique offset arrangement within said feeder and pool to feed the fabric thereon around said mandrel as it rotates and in laminated relation to said plastic, means for varying the temperature of said plastic as it passes through said die with said fabric to form a hard shape of plastic and fabric, and means beyond said die for drawing said hard shape away from said die and off said mandrel.

References Cited in the file of this patent

UNITED STATES PATENTS

| Number | Name | Date |
|---|---|---|
| 1,094,879 | Cobb | Apr. 28, 1914 |
| 1,363,441 | Steele | Dec. 28, 1920 |
| 1,421,306 | Rawlings | June 27, 1922 |
| 1,716,505 | Robinson | June 11, 1929 |
| 1,952,038 | Fischer | Mar. 20, 1934 |
| 1,953,457 | Baer | Apr. 3, 1934 |
| 2,154,333 | Kampfer | Apr. 11, 1939 |
| 2,401,956 | Overbeke | June 11, 1946 |
| 2,427,507 | Powell et al. | Sept. 16, 1947 |
| 2,491,152 | Beidle | Dec. 13, 1949 |
| 2,513,106 | Prendergast | June 27, 1950 |
| 2,517,261 | Veitch | Aug. 1, 1950 |
| 2,519,834 | Hanson et al. | Aug. 22, 1950 |
| 2,528,152 | Landgraf | Oct. 31, 1950 |